US006961441B1

(12) United States Patent
Hershey et al.

(10) Patent No.: US 6,961,441 B1
(45) Date of Patent: Nov. 1, 2005

(54) METHOD AND APPARATUS FOR STEGANOGRAPHIC EMBEDDING OF META-DATA

(75) Inventors: John E. Hershey, Ballston Lake, NY (US); Daniel D. Harrison, Delanson, NY (US); Mark L. Grabb, Burnt Hills, NY (US); Kenneth B. Welles, Scotia, NY (US); Douglas G. Nestler, Los Gatos, CA (US)

(73) Assignee: General Electric Company, Schenectady, NY (US)

( * ) Notice: Subject to any disclaimer, the term of this patent is extended or adjusted under 35 U.S.C. 154(b) by 413 days.

(21) Appl. No.: 09/672,452

(22) Filed: Sep. 29, 2000

(51) Int. Cl.⁷ .......................... G06K 9/00; G06F 7/00; G06F 17/00; H04L 9/00
(52) U.S. Cl. .................. 382/100; 713/176; 707/104.1
(58) Field of Search ................. 382/100, 284, 382/276–308; 713/176; 707/10, 104.1

(56) References Cited

U.S. PATENT DOCUMENTS

| | | | |
|---|---|---|---|
| 5,646,997 A * | 7/1997 | Barton ....................... 713/176 |
| 5,659,726 A | 8/1997 | Sandford, II et al. | |
| 5,867,118 A * | 2/1999 | McCoy et al. ................. 342/90 |
| 5,949,055 A * | 9/1999 | Fleet et al. .................. 235/469 |
| 6,026,193 A | 2/2000 | Rhoads ....................... 382/232 |
| 6,111,954 A | 8/2000 | Rhoads | |
| 6,122,392 A | 9/2000 | Rhoads | |
| 6,122,403 A | 9/2000 | Rhoads | |
| 6,148,149 A | 11/2000 | Kagle ......................... 396/50 |
| 6,222,932 B1 * | 4/2001 | Rao et al. .................... 382/100 |
| 6,233,347 B1 * | 5/2001 | Chen et al. .................. 382/100 |
| 6,278,791 B1 * | 8/2001 | Honsinger et al. .......... 382/100 |
| 6,282,362 B1 | 8/2001 | Murphy et al. ............... 386/46 |
| 6,292,092 B1 * | 9/2001 | Chow et al. ................. 340/5.6 |
| 6,427,020 B1 * | 7/2002 | Rhoads ....................... 382/100 |
| 6,549,922 B1 * | 4/2003 | Srivastava et al. ........... 707/205 |
| 6,647,125 B2 * | 11/2003 | Matsumoto et al. ........ 382/100 |

FOREIGN PATENT DOCUMENTS

JP 2002-216985 A 8/2000

OTHER PUBLICATIONS

"DCT-Based Still Image Compression ICS with Bit-Rate Control" by Nakagawa et al., Jun. 5, 1992.
"System on a Chip for Digital Still Camera" by Okada et al., Jun. 28, 1999.
"Spread Spectrum Image Steganography" by Marval et al., Aug. 1999.

* cited by examiner

*Primary Examiner*—Bhavesh M. Mehta
*Assistant Examiner*—Shefali Patel
(74) *Attorney, Agent, or Firm*—McDermott Will & Emery LLP

(57) ABSTRACT

An electronic device, such as a digital camera, includes sensors to acquire subject data, such as an electro-optical image, as well as additional sensors to acquire meta-data such as temperature, humidity, the identification of the subject data, and the data and time. The electronic device further includes an image evaluator, to determine the best steganographic method to use to combine the meta-data and the subject data, and a steganographic engine, to combine the meta-data and the subject data in an undetectable manner. In this way, meta-data can be associated with the subject data when the subject data is acquired and in a manner that attaches the meta-data and the subject data without requiring generating and maintaining two, linked data sets.

31 Claims, 2 Drawing Sheets

METHOD AND APPARATUS FOR STEGANOGRAPHIC EMBEDDING OF META-DATA

FIELD OF THE INVENTION

The invention relates to digital data acquisition and more particularly to acquisition of both data and related meta-data; the invention has particular applicability, but not limited to, the field of digital photography.

BACKGROUND OF THE INVENTION

Steganography is the art of hiding information to prevent detection of the presence of the hidden information. Previous methods of steganography have included character arrangements, digital signatures, invisible inks, microdots, covert channels and spread-spectrum communications. A related art, cryptography, scrambles messages so they cannot be understood; steganography, however, hides the messages so that they cannot be seen. Conventional computerized steganography tools and software have been developed to embed information in images and other digital information using various computing platforms, software and algorithms. These tools have been developed to function with both lossy and lossless data compression algorithms and to select among various embedding schemes depending on the subject information (i.e., the cover data), the embedded information (i.e., the message), or both. Embedding digital copyright information and watermarks in multimedia data are two examples of current steganography tools and methods.

Digital photography is one area of technology that has recently experienced growth in both popularity and capability. As a result, many individuals and businesses are acquiring large numbers of images that need to be managed and stored. Meta-data, or auxiliary data describing or related to an image or other subject data, is typically used to facilitate the storage and management of subject data. Use of this meta-data allows images to be cataloged, stored, arranged, indexed, searched and retrieved by various methods related to their content and other related information.

Conventional digital imaging methods involve first acquiring a database of different images which are then subsequently processed, one-by-one, to identify and attach meta-data for each image. These conventional methods lead to errors in remembering and identifying meta-data because of the time-lapse between acquiring an image and specifying the appropriate meta-data. These methods also require separate database fields or tables of meta-data that need to be entered, indexed, stored, and maintained separately from the subject data (e.g., images) that the meta-data describes.

A need, therefore, exists for electronic devices that acquire subject, or cover, data to also acquire meta-data corresponding with the subject data and to associate the subject data and the meta-data in an error-free and efficient manner that reduces the resources needed for the storage and management of the subject data. The association of subject data and the meta-data also needs to be accomplished without discernible degradation or attenuation of the subject data.

SUMMARY OF THE INVENTION

These and other needs are addressed by the present invention which provides an electronic data acquiring device that includes meta-data related sensors so that subject data and corresponding meta-data can be acquired together. The device also includes steganographic tools to imperceptibly embed the meta-data within the subject data before the subject data is stored.

Accordingly, one aspect of the invention relates to a method for steganographically combining data that includes acquisition of data by a device, acquisition of meta-data by sensors coupled to the device, and then combining the acquired data and the acquired meta-data such that the resulting combination is imperceptibly different than the acquired data.

Another aspect of the invention relates to a device for generating steganographic data that includes a first set of sensors that acquire subject, or cover, data, a second set of sensors that acquires meta-data associated with the acquired data, and a steganographic engine that combines the acquired data and the acquired meta-data so that the resulting combination differs imperceptibly from the acquired data.

Another aspect of the invention relates to a digital camera that generates meta-data related to an electro-optical image and steganographically combines the meta-data and the image. This camera can store the steganographic combination; transmit the steganographic combination to remote locations; and hash or encrypt the acquired meta-data before performing the data combining.

Additional needs, advantages, and novel features of the invention will be set forth in the description that follows, and in part, will become apparent upon examination or may be learned by practice of the invention. The features and advantages of the invention may be realized and obtained by means of the instrumentalities and combinations particularly pointed out in the appended claims.

BRIEF DESCRIPTION OF THE DRAWINGS

The invention is illustrated by way of example, and not by way of limitation, in the figures of the accompanying drawings and in which like reference numerals refer to similar elements and in which.

DESCRIPTION OF THE PREFERRED EMBODIMENT

A method and system for steganographically embedding cover data and meta data are described herein. In the following description, for purposes of explanation, numerous specific details are set forth in order to provide a thorough understanding of the invention. It will be apparent, however, to one of ordinary skill in the art that the invention may be practiced without these specific details. In other instances, well-known structures and devices are shown in block diagram form in order to avoid unnecessarily obscuring the invention. In particular, digital imaging and corresponding steganography techniques for embedding textual meta-data therein are provided as exemplary components of the invention. However, the application of steganography goes well beyond simply embedding text in an image. It also pertains to other media including voice, text, binary files, and communication channels and to the embedding of messages (e.g., the meta-data) that include plain text, ciphertext, other images, audio segments, and anything else that can be embedded in a bit stream.

Figure 1:
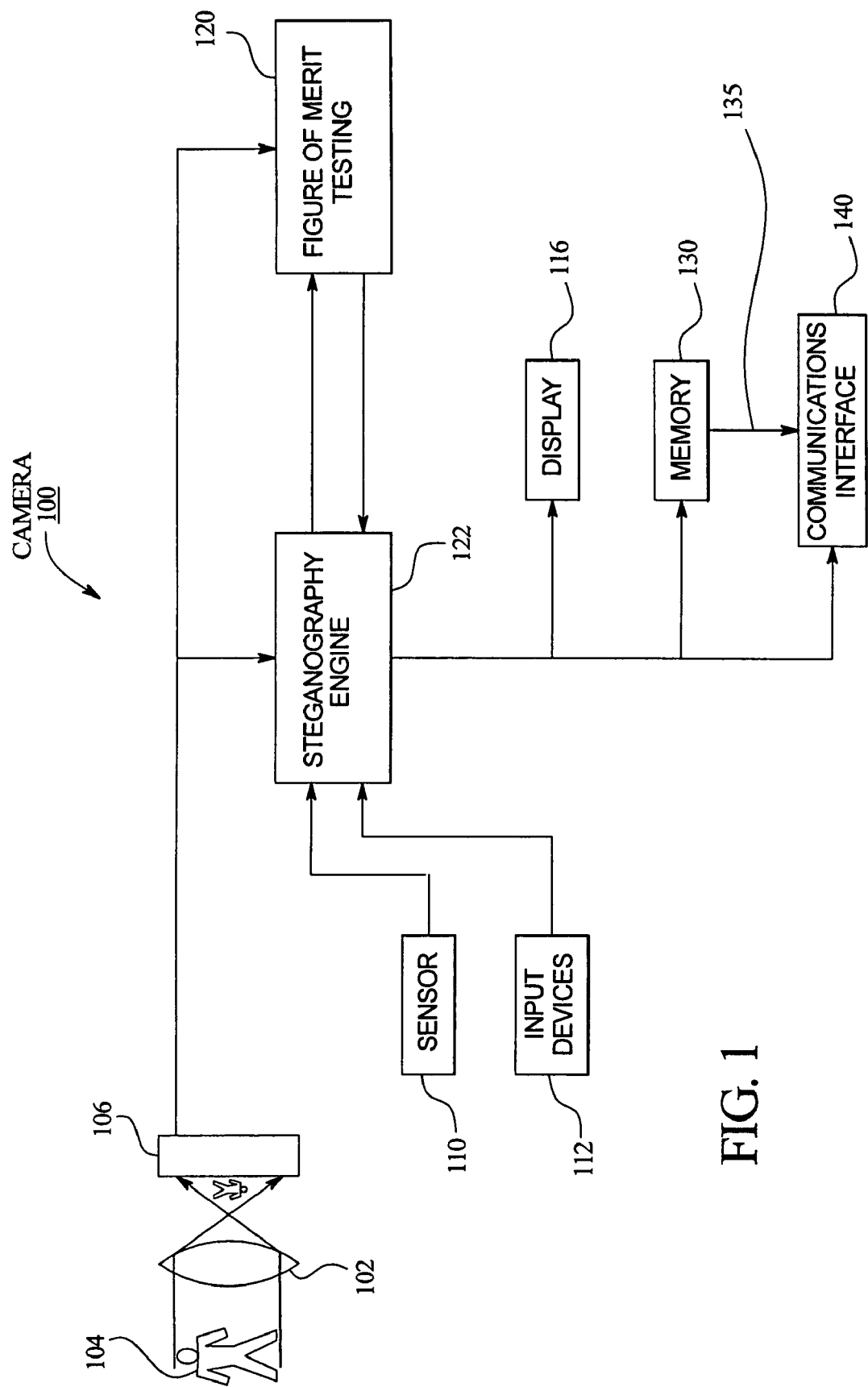
FIG. 1 illustrates a electronic device for acquiring and combining data and meta-data according to one embodiment of the invention.

A schematic view of a digital camera 100 is illustrated in FIG. 1 that can be as simple as a consumer product or as complex as an article inspection station at a manufacturing facility. The actual architecture of camera 100, not depicted in this schematic view, can include a microprocessor and data buses for controlling and connecting the components of FIG. 1. An electro-optical image is acquired via the lens 102 which focuses the depiction of an object 104 on an image plane 106. Image plane 106 can be a charge-coupled device (CCD) or other conventional image sensing devices.

Sensors 110 and other input devices 112 also acquire data simultaneously with or at least near in time with the acquiring of the electro-optical image on the image plane 106. The data acquired by the sensors 110 and other input devices 112 correspond to meta-data related to the image being acquired, or recently acquired, on the image plane 106. The meta-data further identifies or characterizes the image and may be of use in understanding, exploiting or contextualizing the image.

Sensors 110 are preferably a suite of sensors that can provide meta-data that includes GPS information, other spatial coordinate data, date and time information (local and universal), temperature, humidity, atmospheric pressure, other environmental factors, related aural information, magnetic direction of the camera 100, clinometer data, image data such as pixel array size, storage format and palette data, and camera setting data such as aperture, lenses, filters, shutter speed, film speed, range, focus and flash data.

The other input devices 112 provide an interface for a user of the camera 100 to specify meta-data such as a short voice segment, a label for the image, related index terms for the image, identification of the photographer, identification of the subject of the image, or any other information to augment the meta-data acquired by the sensors 110.

The interface provided by the input devices 112 varies according to the complexity and capability of the camera 100. A small, portable camera 100 would preferably have a basic interface that utilizes, for example, up/down arrow buttons that allow navigation of pre-defined menus that are displayed in a small view screen or other display 116. Such menus and controls would allow a user of camera 100 to enter meta-data in addition to that provided by the sensors 110. In a more complex environment, the digital camera 100 may be part of a computer platform with a more complex sensor suite 110 and a more standard user interface that allows robust keyboard and other device input, and also provides a larger display 116. Similar to the more basic example, however, such a complex user interface would still be used to provide meta-data to augment that provided by the sensors 110.

Once an image is acquired, the image undergoes figure-of-merit testing 120 and is forwarded to a steganographic engine 122. The meta-data is collected from the suite of sensors 110 and the input devices 112 is also forwarded to the steganographic engine 122. Figure-of-merit testing 120 involves hardware, software or a combination that performs conventional image analysis techniques to determine appropriate regions of an image in which to embed data and which, of many possible, steganographic methods to use to embed the meta-data. For example, some steganographic methods tend to create speckle effects that would be inappropriate for fashion photos but may be satisfactory for images of soil samples. Other steganographic methods might create a slight palette shift that would be unacceptable for certain types of images.

In addition, steganographic methods of embedding data are less discernible in noisy regions of an image than in uniform regions. Figure-of-merit testing 120, therefore, typically includes conventional image entropy and image region entropy measurements to select appropriate steganographic techniques. While no direct connection is explicitly depicted, in FIG. 1, between the meta-data and the figure-of-merit testing 120, in another embodiment, the amount and type of meta-data could be forwarded to the figure-of-merit testing 120 and used in the testing determination.

Once the figure-of-merit testing 120 determines the particular steganographic method and parameters to use, this information is communicated to the steganographic engine 122 to imperceptibly embed the meta-data within the corresponding acquired image. The steganographic engine 122 is preferably embodied in software, firmware, or a combination, to allow updates as steganography develops further, and applies a variety of conventional steganographic algorithms and techniques for embedding the meta-data in an image. The steganographic engine 122 can be completely implemented in hardware if operating speed is a key design feature of the camera 100. Because user input devices 112 are provided with camera 100, allowing a knowledgeable user to manually select a particular steganographic method can easily be provided using the input devices 112 and the display 116; however, the figure-of-merit testing 120, preferably, automatically selects the best steganographic method for each image without requiring selection input from a user.

Simple embedding of meta-data steganographically in an image is provided below by way of example and is not intended to limit the scope of the present description. In contrast to the simple example provided below, typical electro-optical images can be on the order of 1024×768, or 640×480, pixels, with each pixel having 8, 16 or 24 bits to represent color information and conventional steganographic methods can hide approximately 0.01 bits of information per each image pixel.

A monochromatic picture that is digitized can be represented by M×N picture elements (pixels) comprising B bits each, thus forming an electro-optical image. The electro-optical image can be represented by a N×M matrix of pixel values $\{p_{i,j}\}$.

$$\begin{matrix} p_{1,1} & p_{1,2} & \cdots & p_{1,M} \\ p_{2,1} & p_{2,2} & \cdots & p_{2,M} \\ \vdots & \vdots & \vdots & \vdots \\ p_{N,1} & p_{N,2} & \cdots & p_{N,M} \end{matrix}$$

The B bits of a particular pixel specify one of $2^B$ illumination levels (for convenience assume the least significant bit is on the right). Thus, if B=3, then the eight possible bit patterns for a given pixel would be:

| PIXEL BITS | PIXEL VALUE |
| --- | --- |
| 000 | 0 |
| 001 | 1 |
| 010 | 2 |
| 011 | 3 |
| 100 | 4 |
| 101 | 5 |
| 110 | 6 |
| 111 | 7 |

For a simple, small image with M=N=4 an exemplary representation could be:

| 0<br>(000) | 0<br>(000) | 2<br>(010) | 5<br>(101) |
|---|---|---|---|
| 0<br>(000) | 0<br>(000) | 1<br>(001) | 3<br>(011) |
| 3<br>(011) | 2<br>(010) | 1<br>(001) | 3<br>(011) |
| 7<br>(111) | 5<br>(101) | 4<br>(100) | 2<br>(010) |

One possible meta-data might relate to three bits of data produced by a crude octant compass that indicates the horizontal heading of the camera's lens at the time of the formation of the electro-optical image. The 3 bits could be assigned in the following manner:

| OCTANT LIMITS (degrees) | OCTANT DATA BITS<br>$b_3, b_2, b_1$ |
|---|---|
| 0–44 | 0 0 0 |
| 45–89 | 0 0 1 |
| 90–134 | 0 1 0 |
| 135–179 | 0 1 1 |
| 180–224 | 1 0 0 |
| 225–269 | 1 0 1 |
| 270–314 | 1 1 0 |
| 315–359 | 1 1 1 |

If, at the time a photograph was taken, the camera pointed in the 270–314 octant then the resulting meta-data would be:
$b_1=0$
$b_2=1$
$b_3=1$ A very basic steganographic scheme, provided for illustrative purposes only, might be:
1. encode the 3-bit octant data by adjusting the LSB of pixels as follows:
   A. LSB $(p_{1,1})$+LSB $(P_{3,4})=b_1$
   B. LSB $(P_{2,2})$+LSB $(P_{4,2})=b_2$
   C. LSB $(p_{1,2})$+LSB $(P_{2,1})$+LSB $(P_{4,4})=b_3$
2. the LSBs to be changed are selected from the least non-quiet regions of the image. Examination of the image reveals:

| | |
|---|---|
| LSB $(p_{1,1})$ = 0 | LSB $p_{4,2}$ = 1 |
| LSB $(p_{3,4})$ = 1 | LSB $p_{1,2}$ = 0 |
| LSB $(p_{2,2})$ = 0 | LSB $p_{2,1}$ = 0 |
| | LSB $p_{4,4}$ = 0 |

Accordingly, changes to bits in equation A and C need to be made. Furthermore, $P_{1,1}$, $P_{1,2}$, $P_{2,1}$ and $P_{2,2}$ are in a quiet area (a monochromatic segment of the image). If at all possible, the values of these pixels should not be changed. Therefore, to accomplish the equation A, B and C, the LSBs of $p_{3,4}$ and $P_{4,4}$ are inverted. The resulting image, with the meta-data steganographically embedded therein, is:

| 0<br>(000) | 0<br>(000) | 2<br>(010) | 5<br>(101) |
|---|---|---|---|
| 0<br>(000) | 0<br>(000) | 1<br>(001) | 3<br>(011) |
| 3<br>(011) | 2<br>(010) | 1<br>(001) | 2<br>(010) |
| 7<br>(111) | 5<br>(101) | 4<br>(100) | 3<br>(011) |

Once an image and its meta-data have been steganographically combined, the image can be stored in memory 130 or forwarded to a communication interface 140. Also, via connection 135, stored images can be forwarded to interface 140. The image or images in the memory 130 can be compresses to conserve storage resources using either lossy or lossless compression methods. The communication interface 140 can communicate via conventional wired and wireless media with stand-alone or networked computer systems and storage. In this manner, images acquired by the camera 100 can be shared among widely distributed computer systems. In a preferred embodiment, the resulting steganographic image is not immediately stored in memory 130 but is evaluated to determine whether the resulting image has been perceptibly changed. A user can select either manual or automatic evaluation of the resulting steganographic image.

Preferably the steganographic engine 122 creates a number of steganographic images by using different steganographic techniques on the same acquired image and corresponding meta-data. If the user selects automatic evaluation, then the different steganographic images are compared, using convention image analysis, to the original acquired image by the figure-of-merit testing algorithm 120 to select the one steganographic image with the least discernible changes. This selected steganographic image is then stored in the memory 130. If the user elects to manually evaluate the different steganographic images, then the images are displayed to the user via the display 116; and using the input devices 112, or other controls, the user selects which image to store in memory 130.

Additional aspects of selecting one of multiple steganographic images can include a learning algorithm in the figure-of-merit testing 120 that learns what types of images a user frequently selects during manual evaluation and appropriately modifies the rules for determining appropriate steganographic techniques for embedding meta-data. Another aspect can include utilizing both manual and automatic image evaluation, in either order, when determining which image to store in the memory 130.

If no resulting steganographic image is acceptable, then the user, via input devices 112, can instruct the steganographic engine 122 to re-do the embedding of meta-data using other steganography techniques and methods.

Using the above-described exemplary camera 100, an image can be acquired, corresponding meta-data can be acquired, the image and meta-data can be steganographically combined, and the resulting steganographic image can then be stored. In this manner, meta-data for an image can be attached to the image before other images are acquired resulting in possible confusion and errors. Also, the embedded meta-data can accompany the image without requiring utilization of separate, additional storage, transmission or management resources to accommodate the corresponding meta-data.

Figure 2:
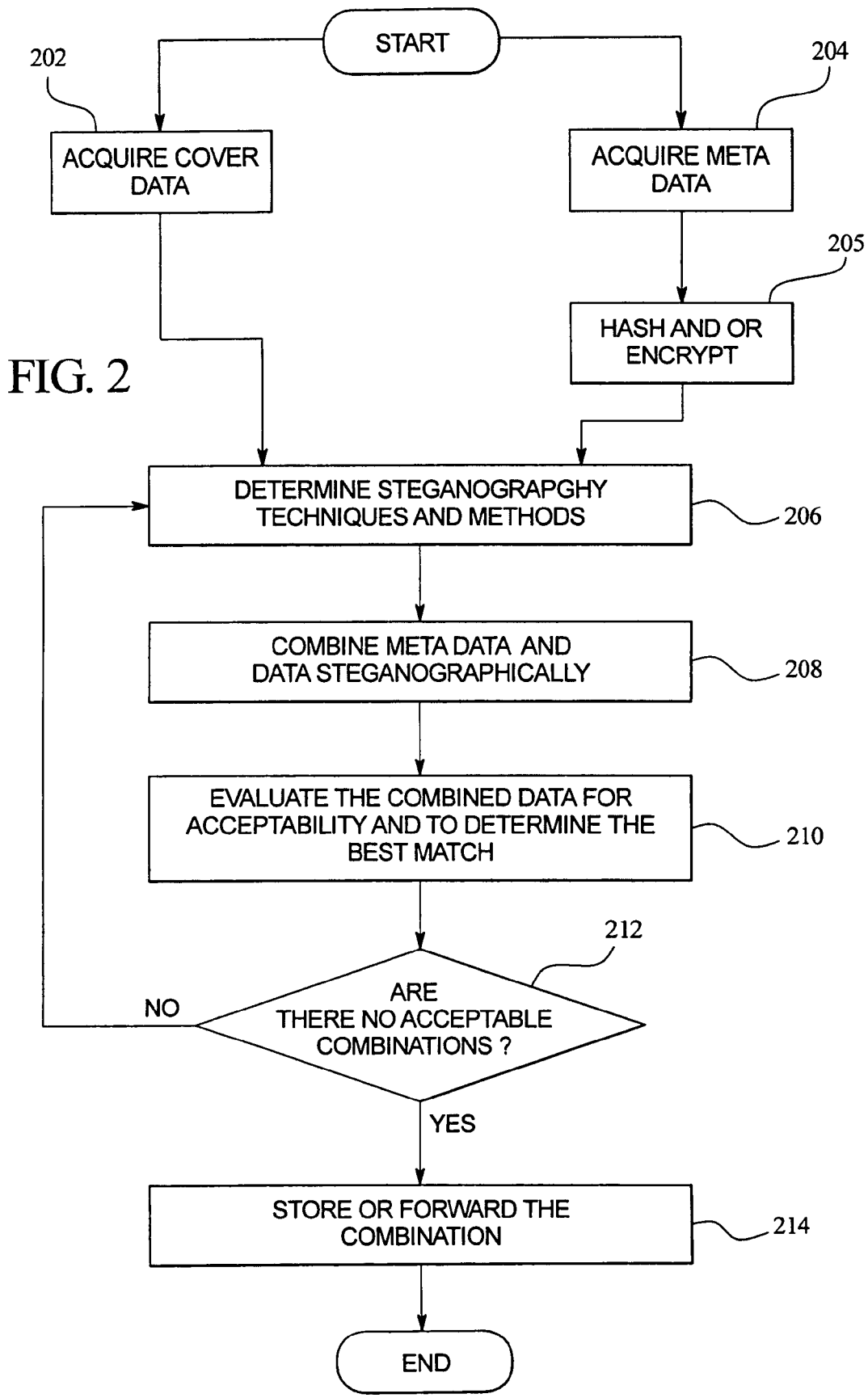
FIG. 2 illustrates a flowchart of a method for acquiring and combining data and meta-data according to an embodiment of the invention.

FIG. 2 depicts a flowchart that illustrates a method for creating a steganographic image, according to an embodiment of the present invention. The accompanying description of the flowchart focuses on the performance of different functions without necessarily describing the specific devices that perform the particular functions. A digital camera, cellular phone or pager, and tape recorder are exemplary electronic devices that can implement the steps of the flowchart depicted in FIG. 2.

The subject data, or cover data, is acquired, in step 202. For a camera the cover data can be an image; for a tape recorder, the cover data can be a voice segment; and for a cellular phone or pager the cover data can be the transmitted signal. In step 204 meta-data is acquired through sensors or via user input. The meta-data acquired in step 204 corresponds to the cover data acquired in step 202 and is acquired simultaneously with the cover data or before different cover data is acquired. From the cover data and meta-data, one or more appropriate steganographic methods are selected, in step 206, for combining the meta-data and the cover data. Using conventional steganography tools, appropriate algorithms can be selected based on the cover data and the meta-data to be embedded therein. Using the selected steganographic methods, the cover data and meta-data are combined, in step 208, so that the meta-data is imperceptibly embedded in the cover data to produce one or more steganographic data combinations. Within this described method, the term "imperceptibly" is intended to mean that a user is unable to detect or discern using typical human sensory functions that the resulting steganographic data differs from the cover data or that any differences, if discernible, are within an acceptable range. The boundaries of this acceptable range vary according to, among other parameters, the cover data and the intended uses for the steganographic data.

Alternatively, the step of steganographically combining the cover data and meta-data (step 208) can be performed without requiring an explicit selection, in step 206, of appropriate steganography methods. In this alternative, step 206 is simply by-passed.

The one or more resulting steganographic data combinations are each evaluated, in step 210, to determine the combination which differs the least from the cover data. Other weighting factors, such as possible data compression ratios, could also be used when evaluating the different steganographic data combinations for a "best" fit.

If no acceptable combination is created in step 208, then, in step 212, the process flow returns to step 206 to create new steganographic data combinations. Once a best combination is created, the process flow continues, in step 212, by storing or forwarding the acceptable steganographic data combination, in step 214. The combination can be stored in memory on the device that acquired the cover data, stored in auxiliary memory located off the device, or forwarded to other remote computer or storage systems via wired or wireless communication protocols.

In order to retrieve the meta-data when a steganographic data combination is received or otherwise accessed, the receiver simply reverses the steganographic method used to originally embed the meta-data. To ensure compatibility, the present inventive electronic devices can 1) use particular steganographic methods agreed upon by industry or standards groups, 2) allow users to select particular steganographic methods so that among the users they can agree on how meta-data is embedded, or 3) embed, or otherwise attach, encoding identification data along with the steganographic combination data.

In situations where the receiver, or accessor, of the meta-data requires some assurance of the identity of the user (or the device) creating the meta-data or some assurance that the meta-data has not been modified, then hashing and/or cryptographic measures can be used when embedding the data.

The flowchart of FIG. 2 includes optional step 205 that relates to hashing and/or encrypting the meta-data. In step 205, the meta-data is hashed, encrypted or both before being combined with the cover data in step 208.

In its simplest form, a hashing step could be used to reduce the amount of meta-data in instances where the user that acquires the cover data and the accessor of the corresponding meta-data have previously agreed upon acceptable meta-data and a hashing algorithm. Under these circumstances, conventional hashing techniques can be used to reduce the size of the embedded meta-data or to verify, to an acceptable level of certainty, that a particular set of meta-data values was present prior to the hashing.

Using conventional symmetrical cryptography methods and techniques, in step 205, meta-data or hashed meta-data, can be encrypted with a private key so that only the holder or holders of the private key can decrypt the meta-data. Conversely, the meta-data or hashed meta-data, can be encrypted using a public key so that accessors of the encrypted meta-data, or hashed meta-data, having the corresponding second key of the public key pair can decrypt, but not successfully alter, the encrypted data.

Preferably, step 205 includes both hashing and encrypting of the meta-data when some level of assurance is needed regarding the accessed meta-data. In these circumstances, a hash of the meta-data is generated and then encrypted. Either symmetrical encryption techniques or asymmetrical encryption techniques can be used. The encrypted hash and/or meta-data are steganographically combined, in step 208, with the cover data. An accessor of the meta-data will decrypt the data and independently generate a hash of the meta-data using the same algorithm originally used. Because of the properties of conventional hashing schemes, even a slight modification of the meta-data will create a large variation in the resulting hashes. Accordingly, if the two hashes are the same then there is a very high probability that the meta-data accessed is the same as the meta-data acquired in step 204.

The foregoing examples have primarily involved electro-optical images and digital cameras. As noted, however, other electronic devices and types of cover data can also benefit from steganographically combining cover data with simultaneously, or nearly simultaneously, acquired meta-data. One such example is embedding the location of a mobile telephone, equipped with a GPS device, within the transmitted voice signal of an emergency, or 911, call. By steganographically combining the voice signal and the GPS or other location information, no auxiliary data channels are needed and the location information cannot become detached from the corresponding transmitted voice signal.

While this invention has been described in connection with what is presently considered to be the most practical and preferred embodiment, it is understood that the invention is not limited to the disclosed embodiment, but on the contrary, is intended to cover various modifications and equivalent arrangements included within the spirit and scope of the appended claims. The invention is capable of other different embodiments and its several details are capable of modifications in various obvious respects, all without departing from the invention. Accordingly, the drawings and description are to be regarded as illustrative in nature, and not as restrictive.

What is claimed is:

1. A method for steganographically combining data, comprising the steps of:
   acquiring first data via a first sensor;
   contemporaneously acquiring meta-data associated with the acquired first data via a second sensor;
   creating a plurality of steganographic data combinations by combining the first data and the contemporaneously acquired meta-data using a plurality of steganographic techniques and a figure-of-merit algorithm for determining an appropriate region of the first data to embed the meta-data for each steganographic technique; and
   using the figure-of-merit algorithm to compare the steganographic data combinations and the originally acquired first data to select a steganographic data combination from the plurality of steganographic data combinations with the least discernible changes from the acquired first data.

2. The method according to claim 1, further comprising the step of:
   storing the steganographic data combinations.

3. The method according to claim 2, wherein the steganographic data combinations are stored in memory coupled with the data source.

4. The method according to claim 2, wherein the steganographic data combinations are stored at a location remote from the site where the first data and meta-data are acquired.

5. The method according to claim 4, further comprising the step of:
   transmitting the steganographic data combinations to the remote location.

6. The method according to claim 1, wherein the step of combining produces one or more steganographic data combinations.

7. The method according to claim 6, further comprising the step of:
   evaluating each of the one or more steganographic data combinations to determine the one combination that most closely matches the acquired first data.

8. The method according to claim 1, further comprising the conditional step of:
   if all of the plurality of steganographic data combinations perceptibly differ from the acquired first data, then repeating the step of creating a plurality of stenographic data combinations.

9. The method according to claim 1, whereby the step of acquiring meta-data is substantially completed before acquiring another first data.

10. The method according to claim 1, wherein at least a portion of the acquired meta-data is related to information received from a user.

11. The method according to claim 1, wherein:
    the first data comprises an electro-optical image produced by a component of a digital camera.

12. The method according to claim 11, wherein:
    the meta-data relates to one or more of identification of the acquired image, parameter settings of the digital camera, an environment in which the image is acquired, and a spatial description of the camera.

13. The method according to claim 1, further comprising the step of:
    pre-processing the meta-data by hashing the meta-data, encrypting the meta-data, or encrypting the hashed meta-data.

14. The method according to claim 1, wherein the first data and the meta-data are acquired via the data source at approximately the same time.

15. A device for generating steganographic data, comprising:
    a first sensor configured to acquire data;
    a second sensor configured to contemporaneously acquire meta-data, wherein the meta-data is associated with the acquired data; and
    a steganographic engine configured to create a plurality of stenographic data combinations by combining the first data and the contemporaneously acquired meta-data using a plurality of steganographic techniques and a figure-of-merit algorithm for determining an appropriate region of the first data to embed the meta-data for each steganographic technique, wherein the steganographic engine is further configured to use the figure-of-merit algorithm to compare the steganographic data combinations and the originally acquired first data to select a steganographic data combination from the plurality of steganographic data combinations with the least discernible changes from the acquired first data.

16. The device according to claim 15, further comprising:
    a memory configured to store the steganographic data combinations.

17. The device according to claim 15, wherein the steganographic data comprises one or more different steganographic data combinations obtained using different combination algorithms.

18. The device according to claim 17, further comprising:
    a figure-of-merit tester configured to determine one of the one or more steganographic data combinations that differs the least from the acquired data.

19. The device according to claim 15, wherein the second sensor further comprises:
    a user interface configured to receive information from a user of the device.

20. The device according to claim 19, wherein the user interface further comprises:
    one or more different kinds of input devices configured to interact with the user interface.

21. The device according to claim 15, further comprising:
    a communications interface configured to transmit the steganographic data combinations to a location remote from the device.

22. The device according to claim 15, wherein the second sensor is controlled to complete acquiring the meta-data before the first sensor acquires other data.

23. The device according to claim 15, wherein the meta-data comprises hashed and encrypted meta-data portions.

24. A digital camera for steganographically combining meta-data, comprising:
    an image plane configured to acquire an electro-optical image;
    a sensor configured to contemporaneously acquire meta-data, said meta-data is associated with the electro-optical image; and
    a steganographic engine configured to create a plurality of stenographic data combinations by combining the electro-optical image and the contemporaneously acquired meta-data using a plurality of steganographic techniques and a figure-of-merit algorithm for determining an appropriate region of the first data to embed the meta-data for each steganographic technique wherein the steganographic engine is further configured to use the figure-of-merit algorithm to compare the steganographic data combinations and the originally acquired electro-optical image to select a steganographic data combination from the plurality of steganographic data combinations with the least discernible changes from the acquired electro-optical image.

25. The digital camera according to claim 24, further comprising:
   memory configured to store the steganographic data combinations.

26. The digital camera according to claim 24, wherein the steganographic data comprises one or more different steganographic data combinations obtained using different combination algorithms.

27. The digital camera according to claim 26, further comprising:
   a figure-of-merit tester configured to determine one of the one or more steganographic data combinations that differs the least from the electro-optical image.

28. The digital camera according to claim 24, further comprising:
   a display area configured to display information related to the meta-data.

29. The digital camera according to claim 24, further comprising:
   a display area configured to display information related to the steganographic data combinations.

30. The digital camera according to claim 24, wherein the sensor is configured to acquire meta-data related to one or more of camera angle, geographical location, environmental conditions, date and time, image subject identification and image parameter settings.

31. The digital camera according to claim 24, wherein the meta-data comprises hashed and encrypted meta-data portions.

* * * * *